United States Patent [19]

Bieber et al.

[11] Patent Number: 4,753,332

[45] Date of Patent: Jun. 28, 1988

[54] FRICTION CLUTCH ASSEMBLY WITH SELECTIVE LUBRICATION DURING THE FRICTION PHASE

[75] Inventors: Gerold Bieber, Langenargen; Otto Ebner, Meckenbeuren, both of Fed. Rep. of Germany

[73] Assignee: Zahnradfabrik Friedrichshafen AG, Friedrichshafen, Fed. Rep. of Germany

[21] Appl. No.: 929,107

[22] PCT Filed: Feb. 18, 1986

[86] PCT No.: PCT/EP86/00081

§ 371 Date: Oct. 15, 1986

§ 102(e) Date: Oct. 15, 1986

[87] PCT Pub. No.: WO86/04968

PCT Pub. Date: Aug. 28, 1986

[30] Foreign Application Priority Data

Feb. 21, 1985 [WO] PCT Int'l Appl. .................. PCT/EP85/00065

[51] Int. Cl.[4] ...................... F16D 13/72; F16D 13/74
[52] U.S. Cl. ................. 192/70.12; 192/113 B
[58] Field of Search ............ 192/113 B, 113 R, 70.12; 188/264 B; 74/467

[56] References Cited

U.S. PATENT DOCUMENTS

| | | | |
|---|---|---|---|
| 3,768,613 | 10/1973 | Brunner | 192/113 B |
| 4,361,217 | 11/1982 | Bieber et al. | 192/103 FA |
| 4,474,278 | 10/1984 | Miura | 192/113 B |
| 4,557,363 | 12/1985 | Golan | 192/113 B |
| 4,624,353 | 11/1986 | Sailer et al. | 192/70.12 |

FOREIGN PATENT DOCUMENTS

| | | |
|---|---|---|
| 727545 | 10/1942 | Fed. Rep. of Germany . |
| 754096 | 2/1945 | Fed. Rep. of Germany . |
| 2941935 | 7/1984 | Fed. Rep. of Germany . |
| 1239144 | 7/1960 | France . |
| 2330915 | 6/1977 | France . |
| 145110 | 6/1920 | United Kingdom . |

*Primary Examiner*—Leslie A. Braun
*Assistant Examiner*—David A. Testardi
*Attorney, Agent, or Firm*—Karl F. Ross; Herbert Dubno

[57] ABSTRACT

A start and shift clutch arrangement for motor vehicles with a disk clutch which during the sliding or friction generating phase is supplied with lubricating and cooling oil, and which runs dry when fully engaged or disengaged. The disk clutch is flooded in the area of the outer disks, whereby the maximum filling is limited by a first standpipe, and rapid emptying takes place via a second standpipe in conjunction with a control valve. Particularly advantageous is a self-contained lubricating system, which fills the clutch space during the sliding phase via an oil reservoir and an accumulator by a timed solenoid valve, utilizing compressed air. The accumulator equipped with a piston effects thereby alternately its own filling, and that of the clutch space.

6 Claims, 1 Drawing Sheet

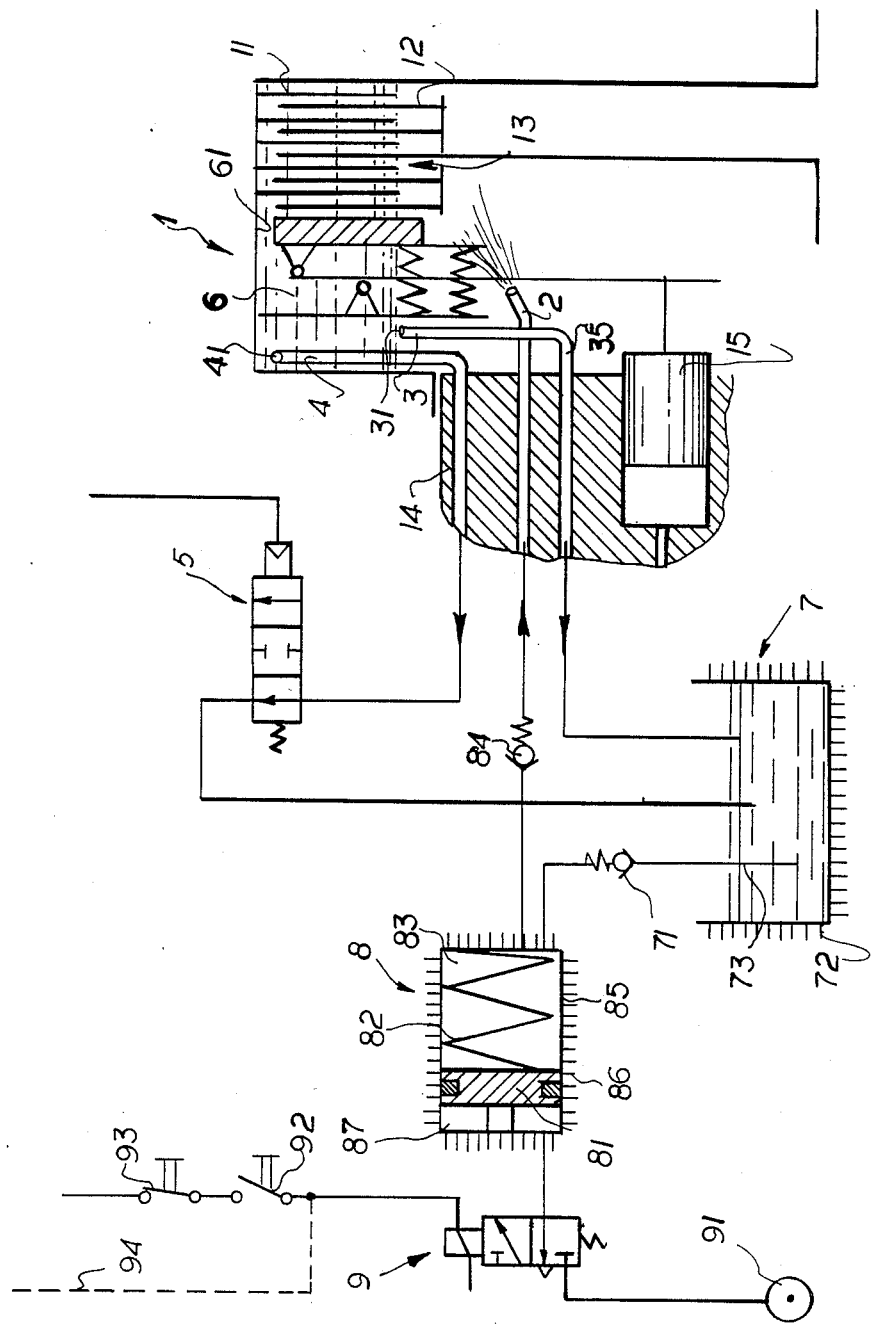

007# FRICTION CLUTCH ASSEMBLY WITH SELECTIVE LUBRICATION DURING THE FRICTION PHASE

CROSS REFERENCE TO RELATED APPLICATION

This application is a National Phase Application corresponding to the International Application PCT/EP86/00081 filed Feb. 18, 1986 and based, in turn, upon a further application filed in Luxembourg under PCT/EP85/00065 of Feb. 21, 1985 under the International Convention and the Patent Cooperation Treaty and the European Patent Convention.

FIELD OF THE INVENTION

The invention relates to a start and shift clutch arrangement.

BACKGROUND OF THE INVENTION

From German Pat. No. 294 1935 a clutch is known, which is arranged in conjunction with a torque converter and therefore predominantly serves as shift clutch for the interruption of tractive force. In order to be capable of transferring the highest possible energy, the clutch disks are fed with lubricating and cooling oil from the oil pressure system of the torque converter or the transmission. The oil feed occurs only during the clutching-in procedure and the conformation of the clutch is such that a separate sump cannot be formed. In this manner, the mass of the clutch and the churning losses of the clutch is kept small.

During the sliding phase of the clutching sufficient lubrication must be present in order to limit frictional heat. The frictional heat which arises, however, must be carried away reliably in order to avoid overheating. This has the consequence that a pump with greater capacity must be provided because even at slow rotational speed sufficient lubricating and cooling means are required. As a consequence too much energy is withdrawn from the drive shaft and the apparatus works uneconomically.

OBJECT OF THE INVENTION

It is therefore the object of the invention, to provide a start and shift clutch arrangement such that the clutch operates in engaged and disengaged condition with minimal losses and is well lubricated during the sliding or friction generating phase, and the frictional heat is reliably carried away.

SUMMARY OF THE INVENTION

A start and shift clutch arrangement for motor vehicles of the invention with a disk clutch which the friction phase is furnished with cooling lubricating and oil, and is dry in engaged or disengaged condition, provides means for flooding the clutch in the area of the disks via a lubricating oil pressure line. The filling with cooling and lubricating oil is limited by means of a first stand pipe and a second stand pipe effects the rapid emptying of the clutch space in conjunction with a control valve.

Due to the flooding of the clutch space in the space of the disks, optimal lubrication is achieved and frictional heat is thereby minimized. Due to the relatively large amount of liquid, the removal of this heat is good, the first standpipe contributes limiting the filling of the clutch space and removing hot oil.

The second stand pipe assures the rapid emptying of the clutch space. The stand pipes are of very simple construction and requiring only little production effort.

The full flooding of the clutch space in the area of the inner and outer disks moving at different rotational speed permits a longer sliding phase without damage to the disks.

Advantageously, the first stand pipe is disposed on the clutch housing in such manner that the aperture is at the same height as the radially inward oriented ends of the outer disks and the aperture of the second stand pipe is located near the radially outer wall of the clutch space. The first standpipe is connected to the oil reservoir directly, and the second standpipe via the control valve.

For the lubricating and cooling oil supply of the start and shift clutch, a lubricating circuit independent of the lubricating supply for the transmission is provided.

In the lubrication circuit for the start and shift clutch an accumulator can be provided in conjunction with a lubricant reservoir, whereby via a timed solenoid valve an impact of compressed air takes place and upon venting due to the pressure of a spring lubricating and cooling oil is aspirated from the lubricant reservoir by a piston of a accumulator via a check valve. The pressure space of the accumulator is connected via a pressure line provided with a check valve with the clutch space of the start and shift clutch in such manner that lubricating oil can only flow in the direction of the clutch.

During the engagement process, that is in the friction phase of the start and shift clutch, a timed solenoid valve effects the aspiration of the lubricating oil into the accumulator—pressurized air is shut off—as well as the flooding of the clutch space up to the moment of transmission of the full torque.

The control valve can be a 3/2-way valve which is closed only as long as the clutch slides, and is open when clutch is engaged or disengaged.

Cooling fins can be provided on the lubricant reservoir and on the housing of the accumulator.

Thus the provision of a self-contained lubricating and cooling oil cycle for the start and shift clutch permits an optimization in the lubricating cycle for the transmission as well as the clutch. The high need for lubricating oil for the clutch occurring intermittently need not be taken in consideration in the dimensioning of the transmission lubrication. Thus the pump for the transmission lubrication can be dimensioned smaller, so that the efficiency increases considerably.

For the start and shift clutch the oil pressure is built up only during the engagement phase, that is only when the need is actually present. In the dimensioning, the input speed of rotation ahead of the transmission e.g. between 500 and 2500 rpm need not considered, so that high losses do not occur. The generation of the lubricating oil pressure for the start and shift clutch by means of the already existing compressed air supply, and in conjunction with a timed solenoid valve, results in a very simple solution. If the accumulator for the lubricating and cooling medium is also equipped with a spring-loaded piston, then the accumulator can be used for the aspiration of the lubricating medium from the lubricant reservoir. By provision of cooling fins on the lubricant reservoir and on the housing of the accumulator their functions are expanded further.

BRIEF DESCRIPTION OF THE DRAWING

The sole FIGURE of the drawing is a diagram of the clutch and lubricating system of the Invention.

SPECIFIC DESCRIPTION

The disk clutch 1 is designed as start clutch and is also used as shift and disconnect clutch. The kinematic construction corresponds to a generally known dry disconnect clutch and the clutch can engage e.g. by spring power, while the disengagement is effected hydraulically or also pneumatically, e.g, via an annular piston diagrammatically represented at 15. The outer disks 11 and inner disks 12 are arranged in known manner, and lubricating oil is supplied to the clutch via a lubricating oil pressure line 2. In addition to the actuating means, two stand pipes 3, 4 are provided in the clutch space 6, where the aperture 31 of the first standpipe 3, as seen in radial direction, is at about the same height as the inner contour of the outer disks 11. The second standpipe 4 is so placed that the aperture 41 is immediately in the bottom of clutch space 6 near the wall 41, which lies radially at the exterior. The first standpipe 3 is connected directly, and the second standpipe 4 via a control valve 5, with an oil reservoir 7. In addition an accumulator 8 is provided, and has a piston 81 which divides it into an oil pressure space 83 with a spring 82 and a pressure space 87 for air. A suction line 73, in which also a check valve 71 is provided, leads from the oil pressure space 83 to the oil reservoir 7. Furthermore, lubricating oil pressure line 2 leads from this pressure space into clutch space 6 via a further check valve 84. The pressure space 87 is connected to a source of compressed air 91 via a timed solenoid valve 9. On the oil reservoir 7 and the housing 85 of accumulator 8 cooling fins 72, 86 are provided. The operation of the timed solenoid valve 9 is initiated either via pressing of switch 92 when limit switch 93 is closed or via electronics line 94.

The start and shift clutch arrangement operates as follows:

The clutch space 6 is dry when clutch 1 is engaged or disengaged The clutch being engaged, no pressure signal (paralleling the pressure applied to piston 15) appears at control valve 5, the valve is in its extreme left position—as drawn. With the clutch disengaged, the control valve 5 is moved into the extreme right position by a high prevailing pressure. In both extreme positions the standpipe 4 is connected to oil reservoir 7. During the process of engagement the valve 5 is held in an intermediate position wherein the clutch is flooded but there is no drainage to the reservoir.

The pressure space 87 of accumulator 8 is vented via the solenoid valve 9. The spring 82 has pushed the piston 81 into the extreme left position as shown and thereby the pressure space 83 has been filled with lubricating and cooling oil via aspirating line 73 and check valve 71.

During the friction phase, that is while the clutch 1 is engaging, it is, with priority, cooled via the self-contained accumulator lubricating system of high capacity.

With the start of the clutch engagement phase, the clutch electronics generate e.g. an electrical signal via line 94 to the timed solenoid valve 9. This now switches about (time phase 1) and the compressed air moves the oil present in pressure space 83 of accumulator 8 into clutch space 6 via check valve 84. The solenoid valve switches into initial position (time phase 2) when time phase 1 has terminated, and accumulator 8 is filled anew in the manner already described. This procedure repeats constantly as long as the electrical signal from the clutch electronics acts upon solenoid valve 9, and that thus the clutch is not engaged. During the entire friction phase the control valve 5 is held in central position and thus prevents oil from draining into oil reservoir 7 via the second stand pipe 4. The lubricating and cooling oil transported further is returned directly to the oil reservoir via the first stand pipe 3 and the line 35 when the clutch is fully flooded in the space of the friction surfaces of the outer disks 11 and the inner disks 12—oil level 13—and the friction phase is not yet terminated, e.g. due to a starting procedure. With the termination of the friction phase, the control valve 5, under spring return, switches to flow-through—as illustrated—and empties the clutch space 6 via the second stand pipe 4. The signal for the timed solenoid valve 9 is likewise interrupted by a switch 92, 93 or the electronics, not shown, so that accumulator 8 fills up again, as already described.

We claim:

1. A clutch assembly, comprising:
   a friction clutch including:
   an annular clutch housing,
   a stack of plates received in an annular clutch chamber in said housing and including outer plates coupled to said housing and inner plates rotatable relative to said outer plates, and
   means for compressing said stack during a friction-generating phase of clutch operation to actuate said clutch from a disengaged phase to an engaged phase thereof;
   a lubricating oil delivery tube opening into said chamber;
   means connected with said oil-delivery tube for feeding same with a lubricating and cooling oil only during said friction-generating phase whereby said chamber is flooded with said lubricating and cooling oil during said friction-generating phase;
   a first liquid-collecting tube extending radially into said chamber and having an opening located radially inwardly of an outer wall thereof for continuously draining said oil from said chamber when said chamber is flooded with said oil;
   a second liquid-collecting tube extending radially into said chamber and having an opening located proximal to said outer wall and radially outwardly of said opening of said first tube; and
   a control valve connected to said second liquid-collecting tube and openable upon termination of said friction-generating phase for rapid draining of said oil from said chamber.

2. The clutch assembly defined in claim 1 wherein said first liquid-collecting tube has its said opening located at the same radial level substantially as the radially innermost ends of said outer plates, said assembly further comprising an oil-collecting reservoir, said first liquid-collecting tube communicating directly with said reservoir and said second liquid-collecting tube communicating with said reservoir through said control valve.

3. The clutch assembly defined in claim 2 wherein said means connected with said oil delivery tube includes:
   an accumulator having an oil chamber connected to said oil delivery tube through a check valve, and a pressurizable chamber separated from said oil chamber by a piston;

a spring acting on said piston for automatic filling of said oil chamber from said reservoir;

a pressure source; and an electromagnetically actuated valve between said source and said pressurizable chamber so that pressure developed in said pressurizable chamber drives said piston against the force of said spring to supply said oil through said oil-delivery tube into said clutch chamber.

4. The clutch assembly defined in claim 3, further comprising circuit means connected to said electromagnetically actuated valve for operating same to block flow of said oil into said accumulator during said friction-generating phase and to effect said flooding of said clutch chamber during said friction-generating phase and up to said engaged phase.

5. The clutch assembly defined in claim 3 wherein said accumulator and said reservoir have walls provided with cooling ribs and wherein said means connected with said oil-delivery tube is independent of any transmission of a vehicle upon which said clutch assembly is provided.

6. The clutch assembly defined in claim 1 wherein said control valve is a three-position, two port valve which is closed only during said friction-generating phase but is open during both said engaged and disengaged phases.

* * * * *